3,608,249
METHOD FOR PREVENTING FIRES DURING PIPELINE SANDBLASTING OPERATIONS
Lester C. Sullivan, Houston, Tex., assignor to Trunkline Gas Company, Houston, Tex.
Filed Aug. 3, 1970, Ser. No. 60,277
Int. Cl. B08b 9/02; B24b 1/00; B24c 1/00
U.S. Cl. 51—321
5 Claims

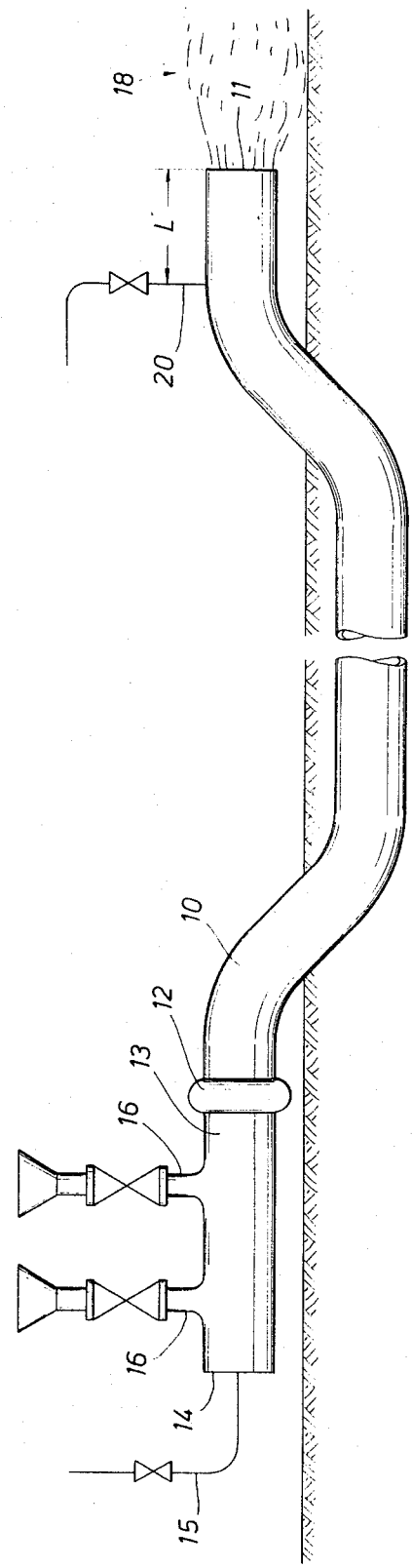

ABSTRACT OF THE DISCLOSURE

When sandblasting a pipeline, a liquid, such as water, is injected into the gas and sand mixture adjacent the outlet of the line. This provides a ground connection for the sand and other solid particles carried by the gas stream to discharge any static electrical charge that may build up on these particles as they travel through the line before the gas stream with the particles enters the atmosphere.

---

This invention relates to pipeline sandblasting.

Over the past few years, a method of sandblasting pipelines to improve their transmission "efficiency" has been developed. Generally, the method involves injecting gas into an inlet into the pipeline, suspending an abrasive material, such as sand, in the gas stream to be carried along with the gas stream through the pipeline to abrade the inside surface of the line. The gas and sand, plus the dust and dirt collected thereby from the walls of the pipe, are discharged into the atmosphere through an outlet at some point spaced from the inlet.

It is a common practice, when sandblasting pipelines, to use natural gas for the sand-carrying medium. This is done for several reasons, not the least of which is because it is usually available with sufficient pressure and volume to perform the job. The use of gas, however, has created a problem at the discharge end of the operation. The sand and other solid particles carried by the gas stream through the line tend to become charged with static electricity. When these particles and the gas leave the line through the outlet, the particles can ignite the gas, should there be a discharge of this static electricity between the particles themselves or between the particles and the ground.

It is an object of this invention to provide a method for sandblasting pipelines that reduces the danger of fires occurring at the outlet end of the pipeline when natural gas is used as the sand-carrying medium.

It is another object of this invention to provide a method for sandblasting pipelines wherein any electrostatic charge that builds up on the sand and other solid particles as they travel through the pipeline is discharged to ground before passing from the pipeline into the atmosphere.

These and other objects, advantages, and features of this invention will be apparent to those skilled in the art from a consideration of this specification, including the attached drawing and appended claims.

In the drawing, a section of pipeline is shown in elevation with the apparatus for practicing the method of this invention connected thereto.

In the drawing, pipeline section 10 has outlet 11 open to the atmosphere and inlet 12 connected to a section of pipe 13. The latter is provided with closed end 14 to which is connected gas line 15. The gas line is connected to a suitable source of natural gas having sufficient pressure and volume for the sandblasting operation. Pipe 13 has one or more valved side outlets 16 through which sand can be dumped into the pipe. The sand can be deposited in pipe 13 before gas is injected therein or it can be introduced into the line at the same time as gas is being injected. Usually, the sand is deposited in the line and then gas is turned on so that it will pick up the sand and carry it with it as it travels on through the pipe section being blasted. Alternatively, the sand could be introduced in the gas before it enters the line through an external hopper arrangement; however, the foregoing is preferred because of its simplicity.

As the gas and sand travel through pipe section 10, the sand impinges against the side of the pipe and smooths it. At the same time the gas is picking up dirt and dust that may have collected in the line. All of this is discharged through outlet 11 into the atmosphere in a manner as represented by cloud 18.

In accordance with this invention, an electrically conductive liquid is injected into the gas and sand mixture adjacent outlet 11 as the mixture leaves the pipeline. As shown in the drawing, valved inlet 20 is connected into pipe section 10 a distance L upstream of outlet 11. The liquid is preferably introduced into the stream as a spray that extends transverse the direction of travel of the gas stream. The spray then provides a ground connection between the solid particles carried by the gas stream so that any static electrical charge or potential that may have been induced on the particles as the particles traveled through the line is discharged to ground.

The amount of liquid used will depend on the size of the pipeline and the rate of flow of the gas. In one test of the method using water, an amount found to be adequate caused a small stream of water to run out the end of the pipe.

As for the distance L, tests indicate that this is not too critical. One one 36-inch line, water was injected at a point 20 feet from the end. This was satisfactory. The distance was gradually reduced to 10 feet, which was also satisfactory. Probably, the smaller the pipe, the closer to the end of the pipe the liquid can be injected.

An added benefit of this method is that by introducing liquid in the manner described above, the solid particles, which include considerable dust usually, will settle to the ground quickly after leaving outlet 11 and can be easily collected and disposed of after the sandblasting operation is finished. Without the introduction of the liquid, the dust and other fine particles blown out of the pipe by the gas stream will be carried away by the wind and will settle out over a large area adjacent the outlet of the line. This is undesirable to say the least, particularly in view of the air pollution problems existing today.

The liquid used in the practice of this method is preferably water, although other liquids can be used if desired. The liquid used, however, should be electrically conductive.

From the foregoing, it will be seen that this invention is one well adapted to attain all of the ends and objects hereinabove set forth, together with other advantages which are obvious and which are inherent to the method.

The apparatus having been described, what is claimed is:

1. A method of increasing the efficiency of a section of a pipeline comprising injecting a gas into one end of the section, suspending an abrasive material, such as sand, in the gas adjacent the inlet to be carried through the pipeline section by the gas, and injecting a liquid into the gas and abrasive mixture before the mixture leaves the other end of the pipeline section to tend to discharge any electrostatic charge carried by the particles before they leave the pipe section to decrease the likelihood of a spark occurring in the gas after it enters the atmosphere.

2. The method of claim 1 in which the liquid injected is water.

3. A method of sandblasting the inside of a section of pipeline, comprising injecting gas into one end of the section, suspending sand in the gas adjacent the point of injection to be carried through the section by the gas, and spraying water into the gas and sand mixture adjacent the other end of the section as the mixture leaves the section to cause the solid particles in the mixture to discharge any electrical potential that may build up between the particles and the ground.

4. A method of sandblasting the inside of a pipeline comprising establishing a gas inlet to and a gas outlet from the pipeline to the atmosphere, admitting a gas into the pipeline through the inlet, suspending sand in the gas adjacent the inlet to be carried along with the gas toward the outlet, and spraying an electrically conductive liquid into the gas and sand mixture adjacent the outlet before the mixture leaves the pipeline through the outlet to provide a ground connection between the solid particles in the gas stream and the pipeline to discharge any electrical potential that may have built up between the particles and the ground before the particles are emitted through the outlet into the atmosphere with the gas.

5. The method of claim 4 in which the injected liquid is water.

References Cited

UNITED STATES PATENTS

| | | | |
|---|---|---|---|
| 3,139,704 | 7/1964 | McCune | 51—8 |
| 3,299,459 | 1/1967 | McCune | 51—8X |
| 3,323,257 | 6/1967 | Fonti | 51—8 |
| 3,427,763 | 2/1969 | Maasberg | 51—321 |

DONALD G. KELLY, Primary Examiner

U.S. Cl. X.R.

15—3.5; 134—8